United States Patent Office 2,792,351
Patented May 14, 1957

2,792,351

PROCESS FOR BREAKING PETROLEUM EMULSIONS EMPLOYING OXYALKYLATION DERIVATIVES OF CERTAIN PHENOLIC RESINS

Melvin De Groote, University City, and Alvin Howard Smith, Kirkwood, Mo., assignors to Petrolite Corporation, Wilmington, Del., a corporation of Delaware No Drawing. Application August 6, 1953, Serial No. 372,811

20 Claims. (Cl. 252—331)

Our invention provides an economical and rapid process for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the invention.

It also provides an economical and rapid process for separating emulsions which have been prepared under controlled conditions from mineral oil, such as crude oil and relatively soft waters or weak brines. Controlled emulsification and subsequent demulsification under the conditions just mentioned are of significant value in removing impurities, particularly inorganic salts, from pipeline oil.

One aspect of the present invention is concerned with the use of oxyalkylated derivatives of a rather limited class of resins, i. e., those in which the phenolic nuclei are separated by a radical having at least a 3-carbon atom chain and are obtained, not by the use of a single aldehyde but by the use of formaldehyde, in combination with a carbonyl compound selected from the class of aldehydes and ketones in which there is an alpha hydrogen atom available as in the case of acetaldehyde or acetone. The manufacture of such resins almost invariably involves the use of a basic catalyst or at least does so in the initial stage. Such bridge radicals between phenolic nuclei have either hydroxyl radicals or carbonyl radicals, or both, and are invariably oxyalkylation-susceptible and also may enter into more complicated reactions as described subsequently. The bridge radical in the initial resin has distinct hydrophile character. Such resins or compounds which can be converted readily into suitable resins are described in the following patents:

| U. S. Patent No. | Dated | Inventor |
| --- | --- | --- |
| 2,191,802 | February 27, 1940 | Novotny et al. |
| 2,448,664 | September 27, 1948 | Fife et al. |
| 2,538,883 | January 23, 1951 | Schrimpe. |
| 2,538,884 | do | Do. |
| 2,545,559 | March 20, 1951 | Do. |
| 2,570,389 | October 9, 1951 | Do. |
| 2,629,703 | February 24, 1953 | Vogelsang. |

More specifically, the present invention is concerned with the use of hydrophile synthetic products; said hydrophile synthetic products being oxyalkylation products of certain alkylene oxides, hereinafter described in detail, and certain phenolic resins obtained by the action of a difunctional phenol and the methylol addition product formed by the reaction of formaldehyde and aldehydes and/or ketones having 2 and not over 8 carbon atoms, which resins are also hereinafter described in detail.

So far as we are aware the nearest approach to oxyalkylated resins of the kind herein specified are somewhat analogous chemical compounds as described in U. S. Patent No. 2,499,365, dated March 7, 1950, to De Groote et al.

We particularly prefer to use those compositions which have sufficiently hydrophile character to at least meet the test set forth in U. S. Patent No. 2,499,368, dated March 7, 1950, to De Groote et al. In said patent such test for emulsification using a water-insoluble solvent, generally xylene, is described as an index of surface activity.

In the present instance the various oxyalkylated resins may not necessarily be xylene-soluble although they are in the vast majority of instances. If such compounds are not xylene-soluble the obvious chemical equivalent or equivalent chemical test can be made by simply using some suitable solvent, preferably a water-soluble solvent such as ethyleneglycol diethylether, or a low molal alcohol, or a mixture to dissolve the appropriate product being examined and then mix with the equal weight of xylene, followed by addition of water. Such test is obviously the same for the reason that there will be two phases on vigorous shaking and surface activity makes its presence manifest. It is understood the reference in the hereto appended claims as to the use of xylene in the emulsification test includes such obvious variant.

For convenience, what is said hereinafter will be divided into four parts:

Part 1 is concerned with a discussion as to the composition or probable composition of the resins herein employed for reaction with alkylene oxides;

Part 2 is concerned with the preparation of suitable resins which may be subjected to reaction with alkylene oxides;

Part 3 is concerned with the preparation of the oxyalkylated derivatives by reacting the resins prepared as in the manner described in Part 2, preceding, with ethylene oxide, propylene oxide, butylene oxide, etc.

Part 4 is concerned with the resolution of petroleum emulsions by use of the oxyalkylated derivatives described in Part 3, preceding.

PART 1

The broad genus involved in the present invention may be divided in two, or perhaps more properly three, sub-genera. Thus, for purpose of convenience it is probably advisable to consider separately, at least in the initial stage of the description, the two sub-genera which make up the genus, i. e., those involving ketones and those involving aldehydes. As to the first sub-genus, our resins may be referred to as phenol-formaldehyde-acetone resins, although they perhaps could be termed more appropriately phenol modified acetone-formaldehyde resins. The conversion of the acetone and formaldehyde by means of alkalis to give resins is well known:

"The condensation of acetone or methyl-ethyl ketone and formaldehyde takes place in the presence of a mild alkaline catalyst at 25°. The initial stages for acetone are:

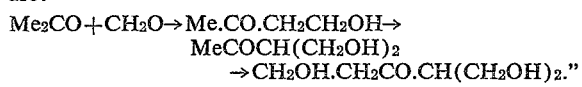

(See "Synthetic Resins and Allied Plastics," Morrell, 1943, p. 356.) A number of recent patents including the abovementioned U. S. Patent 2,570,389 presents additional information as to the mechanism underlying the formation of acetone-formaldehyde resins.

Referring now to another of the aforementioned patents, to wit, U. S. 2,538,884, there is included an explanation of the reactions in which a phenol enters into the combination along with formaldehyde, acetone or the equivalent.

Referring now to the second sub-genera where formaldehyde and acetaldehyde are employed, for example, instead of formaldehyde and acetone the change in structure may be depicted at least in part in the following manner.

Consider first acetaldehyde:

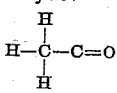

The introduction of two formaldehyde molecules at the alpha hydrogen position followed by reaction with two moles of a phenol may be indicated thus:

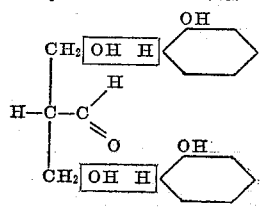

In essence this means that one obtains a resin in which the bridge radical may be represented in the following manner:

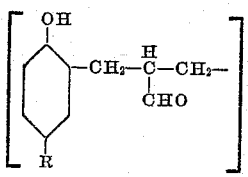

Actually, the employment of a third mole of formaldehyde may involve the introduction of another methylol radical, thus:

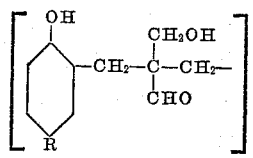

As has been pointed out in the literature dealing with this type of compound, a number of possibilities exist such as cross-linking by the splitting of water from two methylol groups or some equivalent reaction which gives rise to an unsaturated radical which immediately combines with a comparable or similar radical. Another possibility involves the existence of an aldehyde radical which does not seem to be particularly reactive but comparable perhaps to resinification reactions involving only one aldehydic radical of glyoxal.

A more plausible explanation probably is concerned with changes which involve initially one mole of acetaldehyde and 2 moles of formaldehyde which, in turn, combine with phenol so as to give a structure in which a terminal hydroxyl radical and a nuclear hydrogen atom are eliminated as indicated in the following manner:

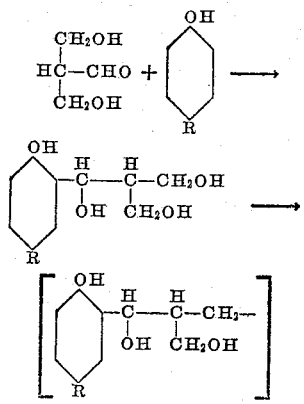

Previous reference has been made to two sub-genera of the broad genus here involved. Actually there could be another subgenera or a hybrid sub-genera in which the characteristics of the other two are present to a greater or lesser degree. Such a particular type is obtained by the use of formaldehyde plus acetone or its equivalent with the additional use of acetaldehyde or an equivalent aldehyde having an alpha hydrogen atom.

Going back to the prior formulas involving formaldehyde and acetone and introducing acetaldehyde to replace part of the formaldehyde, the previously depicted structures become

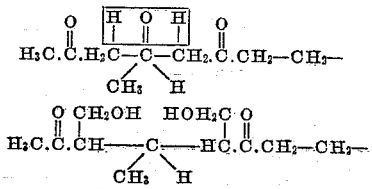

Referring to a resin obtained by the reaction of acetone with formaldehyde and acetaldehyde with formaldehyde and then combining the two the structure might be indicated thus:

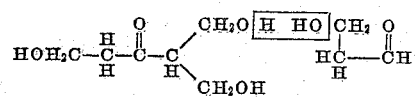

The formula as presented is nothing more or less than three alpha hydrogens of acetone replaced by methylol groups with two groups on one carbon atom and the third group on the other. The formaldehyde-acetaldehyde structure is similar. The combination is shown merely as a dehydration reaction.

Assuming, however, that the acetaldehyde had reacted with two moles of formaldehyde, then the complete reaction can be shown thus:

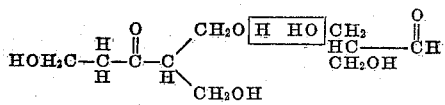

Obviously the molecule thus obtained would be reactive towards a phenol by virtue of the two terminal methylol radicals.

Further speculation as to the actual structure of the bridge radical or radicals is questionable due to the fact that much of what appears in the literature is concerned with an infusible end product. The resins herein employed and susceptible to oxyalkylation are characterized by the fact that they are organic solvent soluble and oxyalkylation susceptible. They are also characterized by the fact that there is at least a three-carbon chain connecting the phenolic nuclei and by the fact that the connecting bridge radical between the phenolic nuclei may be, and probably are oxyalkylation susceptible per se as differentiated from oxyalkylation susceptibility due to the presence of the phenolic hydrogen. This will be discussed in greater detail subsequently. Purely by way of example showing that at baking temperatures, i. e., comparatively high temperatures which are frequently over 150° C. and perhaps higher than 200° C., one does get a completely different resin due to the certain changes which take place, reference is made to Example 1 in the aforementioned U. S. Patent 2,538,884.

In the following description of the oxyalkylation process it is pointed out that it can be conducted at temperatures at/or slightly above the boiling point of water. Indeed, the reaction goes rapidly at 125° to 135° C., i. e., at practically the same temperature or only slightly higher than the temperature used in the initial preparation of the resin described in Example 1 of U. S. Patent 2,538,884. However, the analogue of this particular resin, which for convenience may be referred to as the initial stage resin, is then subjected to oxyalkylation.

During the oxyalkylation step at least five different types of reactions take place, or at least may take place.

(1) Reactions take place which convert the phenolic hydroxyl into an alkanol group such as an ethanol group.

(2) As a result of the previous reaction, i. e., conversion of a phenolic hydroxyl to an alkanol hydroxyl with an intervening ethereal oxygen atom the usual reactive hydrogen atom, i. e., hydrogen in the para- or ortho-position, are deactivated in the sense that they are no longer appreciably reactive to aldehyde or the equivalent.

(3) Reactions of the type which would take place as the temperature of the resin is increased, i. e., conversion from a thermo-plastic type to a thermosetting type, may take place to some extent but obviously some of the more significant reactions, i. e., reactions involving reactive nuclear hydrogen atoms, are eliminated at an early stage for reasons set forth in item 2 immediately preceding.

(4) Oxyalkylation may take place, and in some instances undoubtedly does take place, in the divalent bridge radical.

(5) Some of the reactions involving the bridge radical may result in a substituted dioxolane which in turn perhaps can undergo polymerization in a manner comparable to the polymerization of dioxolane.

PART 2

As previously pointed out, Part 2 is concerned with actual procedural steps for the manufacture of the various kinds of resins described. It will be noted there are shown a number of specific examples followed by added examples in tabular form.

*Example 1a*

Into a glass resin pot were charged 116 grams acetone and 4 grams of 2-normal caustic solution. 485 grams of 37% formaldehyde were then added in a continuous manner. The reaction is very exothermic, and it is necessary to apply cooling during this addition. We have found that satisfactory products can be obtained by maintaining a temperature of from 10° C. to 45° C. It is particularly preferable to maintain the temperature at room temperature or lower. If the temperature is allowed to rise too high, then instead of obtaining a simple methylol-acetone product, a complex, insoluble resin forms which is unreactive and unsuitable for further use in the present instance.

The methylol-acetone product thus formed may then be refluxed for an hour or so to complete the reaction, but we have found that in the case of acetone this produces only negligible gains. Accordingly, we prefer to proceed immediately to the next step: 328 grams of paratertiary amyl phenol and 2 grams of solid caustic are charged into the resin pot. The caustic may be dissolved in a small amount of water, for instance, 5 to 10 cc. About 50 grams of a solvent, such as benzene or xylene, may be added also to facilitate water removal by means of a phase-separating trap. The entire charge is then gradually heated to about 130–150° C. until evolution of water has substantially ceased. This may require from 4 to 6 hours. Additional solvent may be added at this point if desired, and initial addition of solvent may be made at this point.

The distillate will contain small amounts of unreacted formaldehyde and acetone besides water. The amount of distillate was 450 grams. The residual product is a viscous, amber colored fluid. If all solvent is stripped off under vacuum, the resin is an amber colored tacky solid. The yield of active resin was 462 grams.

*Example 2a*

As in Example 1a, the ketone was charged into a resin pot along with the alkaline catalyst. In this case the ketone was cyclohexanone, 196 grams. The catalyst was 8 grams of 2-normal caustic solution. No apparent exothermic reaction occurred as 486 grams of formaldehyde were run in with stirring. After several hours of gentle warming at 60–70° C. the two-phase system gradually became a clear one-phase system, indicating formation of the soluble methylol-cyclohexanone product.

To this mass were added 328 grams of paratertiary amylphenol and 4 grams of solid caustic. 100 grams of xylene were added to serve as solvent and dehydrating agent. The batch was gradually heated to 130–150° C. and held for 4 to 6 hours. The distillate obtained was 417 grams. The product was an extremely viscous, yellowish liquid.

*Example 3a*

Methyl isobutyl ketone, 200 grams, and 8 grams of 2-normal caustic solution were charged into a resin pot. The mixture was warmed to 50–60° C. 180 grams of paraformaldehyde were added in small increments over a 2-hour period. The resulting mixture of ketone and paraformaldehyde was held at 50° C. for an additional 2 hours, during which time reaction took place to give a clear yellow solution.

To the above solution were added 328 grams paratertiary amylphenol, 4 grams solid caustic in 5 to 10 cc. water, and 100 grams of xylene. The batch was gradually heated to 130–150° C. over 4 to 6 hours, until water of evolution was practically nil. 67 grams of distillate were obtained, leaving a cloudy, viscous, dark amber colored liquid.

*Example 4a*

In this case, an aldehyde was condensed with formaldehyde. Unlike ketones, aldehydes are more sensitive to Cannizzaro type reactions, in which simultaneous oxidation and reduction occurs under alkaline conditions. Consequently it is necessary to employ a weaker catalyst, such as a carbonate, possibly in two or more divided portions to produce the desired reaction without going too far.

159 grams of propionaldehyde were charged, along with 222 grams of formaldehyde, into a resin pot. Because this reaction is not quite so violent as a ketone-formaldehyde condensation, it is not necessary to add the formaldehyde continuously. 4 grams of potassium carbonate were added, and the batch refluxed gently at 40–50° C. After one hour, two phases were still present, so an additional 4 grams of potassium carbonate were added. An exothermic reaction ensued which left a clear, one-phase system. The reaction was easily controlled by application of ice water baths.

450 grams of paratertiary amylphenol, an additional 2 grams of potassium carbonate, and 200 grams of xylene, were added. The batch was gradually heated to 130–150° C., over a 3-hour period. The distillate was 197 grams of aqueous solution and 60 grams of an oily phase. The resin was of medium viscosity, clear, bright and amber colored.

*Example 5a*

198 grams of butyraldehyde and 444 grams of formaldehyde were mixed in a resin pot. Over a period of 1½ hours, 6 grams of sodium carbonate were added in two increments. Cooling water was applied so as to keep the temperature below 45° C. As the reaction proceeded, periodic checks showed that the ratio of oil phase to water phase was increasing. Apparently the methylol product in this case is not water soluble.

To the above were then added 450 grams of paratertiary amylphenol and 100 grams of xylene. The resin was formed over a 4 to 6 hour period by heating at 130–150° C. The distillate amounted to 357 grams, leaving a viscous clear, amber, resin with some sediment present.

*Example 6a*

This example is substantially the same as Example 1a. However, the methylol-acetone product, when complete, was made acid by addition of 4 grams of sulfuric acid. The phenol was charged and the resin completed as usual. 468 grams of distillate were obtained. The resin was much more viscous than that of Example 1a, and much darker in color. It appeared to be still easily xylene soluble in spite of its increased degree of condensation.

TABLE I

| Ex. No. | Form-aldehyde (conc.), percent | Wt., gms. | Ketone or aldehyde | Wt., gms. | Catalyst for methylol formation | Phenol | Wt., gms. | Catalyst for resinification | Solvent xylene, gms. |
|---|---|---|---|---|---|---|---|---|---|
| 1a | 37 | 486 | Acetone | 116 | 4 cc. 2 N NaOH | p,t,Amyl | 328 | 2 gm. NaOH | 350 |
| 2a | 37 | 486 | Cyclohexanone | 196 | 8 cc. 2 N NaOH | do | 328 | 4 gm. NaOH | 100 |
| 3a | 100 | 180 | Methyl isobutyl ketone | 200 | do | do | 328 | do | 100 |
| 4a | 37 | 222 | Propionaldehyde | 159 | 8 gm. $K_2CO_3$ | do | 450 | 2 gm. $K_2CO_3$ | 200 |
| 5a | 37 | 444 | Butyraldehyde | 198 | 6 gm. $Na_2CO_3$ | do | 450 | | 100 |
| 6a | 37 | 486 | Acetone | 116 | 6 cc. 2 N NaOH | do | 328 | 4 gm. $H_2SO_4$ | 250 |
| 7a | 37 | 630 | do | 150 | do | Nonyl | 569 | 3 gm. NaOH | 300 |
| 8a | 37 | 486 | do | 116 | do | a-Ethyl phenyl | 380 | 4 gm. NaOH | 100 |
| 9a | 37 | 324 | Octyl aldehyde | 256 | 5 gm. $K_2CO_3$ | p,t,Amyl | 328 | do | 100 |
| 10a | 37 | 610 | Acetone | 145 | 4 cc. 2 N NaOH | do | 615 | 2 gm. NaOH | 180 |
| 11a | 37 | 555 | do | 133 | do | do | 279 | do | 100 |
| 12a | 37 | 890 | do | 212 | do | do | 300 | do | 250 |
| 13a | 37 | 369 | 2-ethyl hexaldehyde | 291 | 9 gm. $Na_2CO_3$ | do | 280 | | 100 |
| 14a | 37 | 444 | Butyraldehyde | 198 | 6 gm. $Na_2CO_3$ | p,t,Butyl | 412 | | 100 |
| 15a | 37 | 585 | Acetone | 139 | 8 cc. 2 N NaOH | p-Cresol | 259 | 2 gm. NaOH | 250 |
| 16a | 37 | 388 | Propionaldehyde | 139 | 3 gm. $Na_2CO_3$ | p,t,Butyl | 360 | | 100 |
| 17a | 37 | 444 | Butyraldehyde | 198 | 6 gm. $Na_2CO_3$ | p-Cresol | 296 | | 100 |
| 18a | 37 | 486 | Acetone | 116 | 8 cc. 2 N NaOH | p,t,Butyl | 300 | 2 gm. NaOH | 100 |
| 19a | 37 | 388 | Propionaldehyde | 139 | 3 gm. $Na_2CO_3$ | p-Cresol | 260 | | 100 |
| 20a | 37 | 369 | 2-ethyl hexaldehyde | 291 | 9 gm. $Na_2CO_3$ | p,t,Butyl | 256 | | 100 |
| 21a | 37 | 594 | Butyraldehyde | 264 | 6 gm. $Na_2CO_3$ | p,t,Amyl | 300 | | 100 |
| 22a | 37 | 406 | Acetone | 145 | 4 cc. 2 N NaOH | do | 410 | 3 gm. $H_2SO_4$ | 380 |
| 23a | 37 | 486 | Methyl isobutyl ketone | 200 | 8 cc. 2 N NaOH | do | 328 | 4 gm. NaOH | 100 |
| 24a | 37 | 324 | Propionaldehyde | 116 | 2 gm. $K_2CO_3$ | do | 328 | do | 100 |
| 25a | 37 | 486 | Acetone acetaldehyde | 58 | 4 cc. 2 N NaOH | do | 328 | do | 250 |
| 26a | 37 | 648 | Acetone propionaldehyde | 58 | do | Nonyl | 440 | do | 250 |

TABLE II

| Ex. No. | Avg. temp. during first stage, °C. | Approx. time period, hrs. | Max. temp. during second stage, °C. | Approx. time period, hrs. | Aqueous distillate, gms. | Percent HCHO in distillate | Theo. mol. ratio, HCHO:ketone:phenol | Found ratio on final prod. |
|---|---|---|---|---|---|---|---|---|
| 1a | 30 | 1.5 | 150 | 4 | 449 | 6.3 | 3:1:1 | 2.5:1.5:1 |
| 2a | 65 | 3.0 | 150 | 5 | 417 | 10.5 | 3:1:1 | 2.3:1:1 |
| 3a | 50 | 4.0 | 150 | 5 | 67 | 7.1 | 3:1:1 | 3:1:1 |
| 4a | 50 | 4.0 | 150 | 6 | 197 | | 1:1:1 | |
| 5a | 40 | 4.5 | 150 | 6 | 357 | | 2:1:1 | |
| 6a | 30 | 1.5 | 150 | 3 | 468 | 8.7 | 3:1:1 | 2.3:.75:1 |
| 7a | 30 | 2.0 | 150 | 6 | | | 3:1:1 | |
| 8a | 30 | 1.5 | 150 | 6 | | | 3:1:1 | |
| 9a | 50 | 5.0 | 150 | 8 | 285 | 17.8 | 2:1:1 | 1:1:1 |
| 10a | 30 | 2.0 | 150 | 4 | 580 | 9.5 | 3:1:1.5 | 1.5:0.5:1 |
| 11a | 30 | 2.02 | 150 | 4 | 485 | 7.1 | 3:1:0.75 | 2.5:1:0.75 |
| 12a | 30 | 2.0 | 150 | 5 | 830 | 11.0 | 3:1:0.5 | 2.25:0.8:0.5 |
| 13a | 60 | 5.0 | 150 | 6 | | | 2:1:0.75 | |
| 14a | 40 | 4.0 | 150 | 6 | 378 | | 2:1:1 | |
| 15a | 30 | 2.0 | 150 | 3.5 | 507 | | 3:1:1 | |
| 16a | 50 | 3.0 | 150 | 5 | 347 | | 2:1:1 | |
| 17a | 40 | 4.0 | 150 | 4 | 367 | | 2:1:1 | |
| 18a | 30 | 1.5 | 150 | 4 | 452 | | 3:1:1 | |
| 19a | 50 | 4.0 | 150 | 4 | 334 | | 2:1:1 | |
| 20a | 50 | 5.0 | 150 | 6 | 291 | | 2:1:0.75 | |
| 21a | 40 | 4.0 | 150 | 5 | 405 | | 2:1:0.5 | |
| 22a | 30 | 2.5 | 150 | 3 | 484 | 8.2 | 2:1:1 | 1.5:0.2:1 |
| 23a | 50 | 3.0 | 150 | 5 | 430 | 8.8 | 3:1:1 | 2.5:1:1 |
| 24a | 50 | 3.0 | 150 | 6 | 285 | 8.2 | 2:1:1 | 1.5:1:1 |
| 25a | 30 | 2.5 | 150 | 6 | 450 | | 6:(1:1):2 | |
| 26a | 30 | 3.0 | 150 | 5 | 613 | | 8:(1:1):2 | |

As indicated in above Table I, the resins are made in two stages: First, the methylol addition product is made. This may take from one to 4 hours, depending on the reactivity of the ketone or aldehyde used. The reactivity also decides whether cooling or gentle warming is necessary. The second stage involves heating to effect the resinification and drive off water. It may be desirable to strengthen the catalyst for this stage. Resinification usually takes from 2 to 6 hours if the reaction is stopped at 150° C.

Note that HCHO is shown present in some of the distillates. From a comparison of this and the distillate weight with the theoretical distillate, it was possible to estimate the actual combining ratios obtained. In other cases, either no HCHO was lost, or it was impractical to measure it because of interfering agents in the distillate. With the exception of Example 22a, only minor losses seem to be indicated.

PART 3

Having obtained a suitable resin, or for that matter a mixture of resins, as described in Part 2, preceding, the actual oxyalkylation procedure is comparable to that which has been described repeatedly in the literature in connection with the production of various oxyalkylated compounds. Oxyethylation, oxypropylation or oxybutylation may be conducted intermittently or continuously until the appropriate point is reached. As the oxyalkylation procedure is substantially conventional, and is carried out in conventional equipment, it will be simply illustrated by the following examples:

*Example 1b*

The oxyalkylation-susceptible compound employed was the resin previously described as Example 4a. Example 4a, in turn, was obtained from propionaldehyde, formaldehyde and para-tertiary-amylphenol, as previously described and summarized in Table I. The autoclave employed in this particular instance was approximately 5 gallons in size. 5.54 pounds of resin 4a were placed in the autoclave along with an equal amount of solvent. In this series of examples the solvent employed was xylene. The amount of catalyst used (finely powdered caustic soda) was .24 pounds. Adjustment was made to operate the autoclave at approximately 125° C. In some other instances higher temperatures were employed, up to 145° C. Adjustment was made also to operate at a pressure not in excess of 35 pounds per square inch. The time regulator was set so as to inject 1.05 pounds of ethylene oxide slowly over a one-hour period. The reaction went readily and, as a matter of fact, the oxide was taken up probably in considerably less than this time. The speed of reaction, particularly at the comparatively low pressure, undoubtedly was due in a large measure to effective agitation and also to the comparatively high concentration of catalyst. The theoretical molecular weight at the end of the reaction was 1038. The molal ratio of ethylene oxide to oxyalkylation-susceptible compound (i. e., the initial resin) was 3.8 to 1.

*Example 2b*

This example illustrates further oxyalkylation of Example 1b, preceding. The oxyalkylation-susceptible compound, to wit, 4a, is the same as was used in Example 1b, because it was merely a continuation. In subsequent examples, such as for example listed in Table III, the oxyalkylation-susceptible compound shown in the horizontal line concerned with Example 2b refers to oxyalkylation-susceptible compound 4a. Actually, one could refer just as properly to Example 1b at this stage. It is immaterial which designation is used so long as its use is practiced consistently throughout the tables. In any event, the amount of ethylene oxide used is the same as before, to wit, 1.05 pounds. This means the oxide at the end was 2.0 pounds. Similarly, the ratio of ethylene oxide to oxyalkylation-susceptible compound (molar basis) at the end was 7.6 to 1. The theoretical molecular weight was 1200. There was no added solvent. Similarly, there was no added catalyst. The time period was slightly less than one hour.

In all succeeding examples the temperature and pressure were the same as previously, to wit, 125° C. and not over 35 pounds per square inch. The time element varied somewhat as noted in succeeding examples.

*Example 3b*

The oxyethylation proceeded in the same manner as described in Examples 1b and 2b, preceding. There was no added solvent and no added catalyst. The oxide added was the same as before, to wit, 1.05 pounds. The total oxide at the end of the oxyalkylation procedure was 3.15 pounds. The molal ratio of oxide to condensate was 11.4 to 1. The theoretical molecular weight was 1,370. As noted previously, the conditions in regard to temperature and pressure were the same as in regard to Examples 1b and 2b. The time period was a little longer than before, to wit, 1.2 hours.

*Example 4b*

The oxyethylation was continued and the amount of oxide added was the same as before, to wit, 1.05 pounds. The amount of oxide added at the end of the reaction was 4.2 pounds. There was no added solvent and no added catalyst. Conditions as far as temperature and pressure were concerned were the same as in previous examples. The time period was the same as the previous time period, to wit, a little over one hour. The reaction at this point showed a slight tendency to slow up. The molal ratio of oxide to oxyalkylation-susceptible compound was 15.2 to 1. The theoretical molecular weight was 1,536.

*Example 5b*

The oxyethylation was continued with the addition of another 1.05 pounds of oxide. No added solvent was introduced and likewise no added catalyst was introduced. The theoretical molecular weight at the end of the reaction was 1,700. The molal ratio of oxide to oxyalkylation-susceptible compound was 19.0 to 1. The time period was 2 hours.

In the majority of cases we have used a 5-gallon autoclave, although at other times a 10, 15 or 35 gallon autoclave was used, depending largely on the amount of alkylene oxide employed. This was purely a matter of convenience. The solvent used in all cases was xylene. The catalyst used was finely powdered caustic soda.

Referring now to Tables III, IV and V, it will be noted that Examples 1b through 11b were obtained by the use of ethylene oxide whereas Examples 1c through 16c in Table IV were obtained by use of propylene oxide. Similarly, Examples 1d through 8d were obtained by use of butylene oxide.

Referring now to Table VI, it will be noted that the series of examples beginning with 1e were obtained in turn by use of both ethylene and propylene oxide, using ethylene oxide first; in fact, using Example 11b as the oxyalkylation-susceptible compound in the first four examples.

In the second four examples of Table VI, 5e through 8e, propylene oxide was used first and then ethylene oxide, 5e being obtained in turn from 4c. In series 9e through 11e, propylene oxide was used first, followed by butylene oxide, 9e in turn being obtained from 12e. In the series 12e through 15e butylene oxide was used first, followed by the use of ethylene oxide, 12e being obtained in turn from 8d. In the series 16e through 19e, propylene oxide was used first, followed by ethylene oxide, 16e in turn being obtained from 16c.

Referring now to Table VII it will be noted that all three oxides were used, 1f being obtained by use of butylene oxide, using 19e as the oxyalkylation-susceptible compound. 19e, as noted previously, was obtained from 16c, that is, a compound in which propylene oxide was used first and then ethylene oxide.

Similarly, series 3f through 5f involved the use of all three compounds, 3f being obtained from 4e. 4e was obtained by first treating the resin with ethylene oxide and then with propylene oxide. In this instance, butylene oxide was added last.

Referring now to Table III in greater detail the data are as follows. The first column gives the table number; the second column gives the oxyalkylation-susceptible compound which, as previously noted, in series 1b through 5b, is 4a, although it would be just as proper to say that in the case of 2b the oxyalkylation-susceptible compound was 1b, and in the case of 3b the oxyalkylation-susceptible compound was 2b. Actually, reference is made to the parent derivative for the reason that the figures stay constant and probably lead to a more convenient presentation. Thus, the third column indicates the amount of the oxyalkylation-susceptible compound employed. The fourth column shows the amount of ethylene oxide in the mixture prior to the particular oxyalkylation step. In the case of Example 1b there is no oxide used but it appears in 2b, 3b, etc.

The fifth column can be ignored for the reason that it is concerned with propylene oxide only, and the sixth column can be ignored for the reason that it is concerned with butylene oxide only.

The seventh column shows the catalyst which is invariably powdered caustic soda. The quantity used is indicated.

The eighth column shows the amount of solvent, which is xylene unless otherwise stated.

The ninth column shows the amount of oxyalkylation-susceptible compound which in this series is the resin described.

The tenth column shows the amount of ethylene oxide in at the end of the particular step.

Column eleven shows the same data for propylene oxide, and column twelve for butylene oxide. For obvious reasons these can be ignored in the series 1b through 11b.

Column thirteen shows the amount of catalyst at the end of the oxyalkylation step, and column fourteen shows the amount of solvent at the end of the oxyalkylation step.

The fifteenth, sixteenth and seventeenth columns are concerned with molal ratio of the individual oxides to the oxyalkylation-susceptible compounds. Data appears only in column fifteen for the reason that, as previously noted, no butylene or propylene oxide were used in the present instance.

The theoretical molecular weight appears at the end of the table which is on the assumption, as previously noted, as to the probable molecular weight of the initial compound, and on the assumption that all oxide added during the period combined. This is susceptible to limitations that have been pointed out elsewhere, particularly in the patent literature.

Referring now to the second series of compounds in Table IV, Examples 1c, 2c, etc., the situation is the same, except that it is obvious the oxyalkylating agent used was propylene oxide and not ethylene oxide. Thus, the fourth column becomes a blank, and columns ten and fifteenth become blanks, but column five which was previously a blank in the earlier part of the table now carries data as to the amount of propylene oxide present at the beginning of the reaction.

Column eleven carries data as to the amount of propylene oxide present at the end of the reaction, and column sixteen carries data as to the ratio of propylene oxide to the oxyalkylation-susceptible compound. In all other instances the various headings have the same significance as previously.

Referring now to Table V, which is concerned with examples 1d through 8d, columns four and five are blanks, as are columns ten, eleven, fifteen and sixteen, but data appear in column six as to butylene oxide present before the particular oxyalkylation step. Column twelve gives the amount of butylene oxide present at the end of the step, and column seventeen gives the ratio of butylene oxide to oxyalkylation-susceptible compound.

Table VI, which is concerned with Examples 1e through 19e, shows the same data presented in the same way except that two oxides appear, to wit, ethylene oxide and propylene oxide. This means that there are only three columns in which data does not appear, all three being concerned with the use of butylene oxide. Furthermore, it shows which oxide was used first by the very fact that reference to Example 1e in turn refers to 11b, and also shows that ethylene oxide was present at the very first stage. Furthermore, for ease of comparison and also to be consistent, the data under "Molal ratio" in regard to ethylene oxide and propylene oxide goes back to the original diepoxide-derived condensate 13a. This is obvious because the figures 18.6 and 3.1 coincide with the figures for 11b derived from 13a as shown in Table III.

In Examples 5e through 8e the same situation is involved except that propylene oxide is used first and this again is apparent. Three columns are blank referring to butylene oxide. The same situation applies, for example, in 16e through 19e where propylene oxide is used first and then ethylene oxide.

The final table, to wit, Table VII, shows Examples 1f through 5f. In these instances all three oxides are used so there are no blanks.

In light of what has been said previously, it is not believed any further explanation is required and also due to the way the data has been presented in tabular form.

As pointed out previously certain initial runs using one oxide only, or in some instances two oxides, had to be duplicated when used as intermediates subsequently for further reaction. It would be confusing to refer in too much detail in these various tables for the reason that all pertinent data appear and the tables are essentially self-explanatory.

Reference to solvent and amount of alkali at any point takes into consideration the solvent from the previous step and the alkali left from this step.

The products resulting from these procedures may contain modest amounts, or have small amounts, of the solvents as indicated by the figures in the Tables. If desired, the solvent may be removed by distillation, and particularly vacuum distillation. Such distillation also may remove traces or small amounts of uncombined oxide, if present and volatile under the conditions employed.

Obviously in the use of ethylene oxide and propylene oxide in combination one need not first use one oxide and then the other, but one can mix the two oxides and thus obtain what may be termed an indifferent oxyalkylation, i. e., no attempt to selectively add one and then the other, or any other variant.

Needless to say, one could start with ethylene oxide and then use propylene oxide, and then go back to ethylene oxide; or, inversely, start with propylene oxide, then use ethylene oxide, and then go back to propylene oxide; or, one could use a combination in which butylene oxide is used along with either one of the two oxides just mentioned or a combination of the two.

The same would be true in regard to a mixture of ethylene oxide and butylene oxide, or butylene oxide and propylene oxide.

The colors of the products usually vary from a reddish amber tint to a definitely red, amber, and to a straw or light straw color. The reason is primarily that no effort is made to obtain colorless resins initially and the resins themselves may be yellow, amber, or even dark amber. Condensation of a nitrogenous product invariably yields a darker product than the original resin and usually has a reddish color. The solvent employed, if xylene, adds nothing to the color but one may use a darker colored aromatic petroleum solvent. Oxyalkylation generally tends to yield lighter colored products and the more oxide employed the lighter the color of the product. Products can be prepared in which the final color is a lighter amber or straw color with a reddish tint. Such products can be decolorized by the use of clays, bleaching chars, etc. As far as use in demulsification is concerned, or some other industrial uses, there is no justification for the cost of bleaching the product.

Generally speaking, the amount of alkaline catalyst present is comparatively small and it need not be removed. The preferred procedure is to ignore the presence of the alkali unless it is objectionable or else add a stoichiometric amount of concentrated hydrochloric acid equal to the caustic soda present.

TABLE III

| Ex. No. | OSC, ex. No. | OSC, lbs. | Oxides | | | Catalyst, lbs. | Solvent, lbs. | OSC, lbs. | Oxides | | | Catalyst, lbs. | Solvent, lbs. | Molal ratio | | | Theo. mol. wt. |
|---|---|---|---|---|---|---|---|---|---|---|---|---|---|---|---|---|---|
| | | | EtO, lbs. | PrO, lbs. | BuO, lbs. | | | | EtO, lbs. | PrO, lbs. | BuO, lbs. | | | EtO to oxyalkyl. suscept. compd. | PrO to oxyalkyl. suscept. compd. | BuO to oxyalkyl. suscept. compd. | |
| 1b | 4a | 5.54 | 0 | | | 0.24 | 5.54 | 5.54 | 1.05 | | | 0.24 | 5.54 | 3.8 | | | 1,038 |
| 2b | 4a | 5.54 | 1.05 | | | 0.24 | 5.54 | 5.54 | 2.1 | | | 0.24 | 5.54 | 7.6 | | | 1,204 |
| 3b | 4a | 5.54 | 2.10 | | | 0.24 | 5.54 | 5.54 | 3.15 | | | 0.24 | 5.54 | 11.4 | | | 1,370 |
| 4b | 4a | 5.54 | 3.15 | | | 0.24 | 5.54 | 5.54 | 4.2 | | | 0.24 | 5.54 | 15.2 | | | 1,536 |
| 5b | 4a | 5.54 | 4.20 | | | 0.24 | 5.54 | 5.54 | 5.25 | | | 1.24 | 5.54 | 19.0 | | | 1,702 |
| 6b | 13a | 5.2 | 0 | | | 0.21 | 5.2 | 5.2 | 0.6 | | | 0.21 | 5.2 | 3.1 | | | 1,302 |
| 7b | 13a | 5.2 | 0.6 | | | 0.21 | 5.2 | 5.2 | 1.2 | | | 0.21 | 5.2 | 6.2 | | | 1,436 |
| 8b | 13a | 5.2 | 1.2 | | | 0.21 | 5.2 | 5.2 | 1.8 | | | 0.21 | 5.2 | 9.3 | | | 1,570 |
| 9b | 13a | 5.2 | 1.8 | | | 0.21 | 5.2 | 5.2 | 2.4 | | | 0.21 | 5.2 | 12.4 | | | 1,704 |
| 10b | 13a | 5.2 | 2.4 | | | 0.21 | 5.2 | 5.2 | 3.0 | | | 0.21 | 5.2 | 15.5 | | | 1,838 |
| 11b | 13a | 5.2 | 3.0 | | | 0.21 | 5.2 | 5.2 | 3.6 | | | 0.21 | 5.2 | 18.6 | | | 1,972 |

TABLE IV

| Ex. No. | Composition before ||||||| Composition at end ||||||| Molal ratio ||| Theo. mol. wt. |
| | OSC, ex. No. | OSC, lbs. | Oxides ||| Catalyst, lbs. | Solvent, lbs. | OSC, lbs. | Oxides ||| Catalyst, lbs. | Solvent, lbs. | EtO to oxyalkyl. suscept. compd. | PrO to oxyalkyl. suscept. compd. | BuO to oxyalkyl. suscept. compd. | |
| | | | EtO, lbs. | PrO, lbs. | BuO, lbs. | | | | EtO, lbs. | PrO, lbs. | BuO, lbs. | | | | | | |
|---|---|---|---|---|---|---|---|---|---|---|---|---|---|---|---|---|---|
| 1c | 18a | 4.26 | | 0 | | 0.17 | 4.26 | 4.26 | | 0.7 | | 0.17 | 4.25 | | 2.5 | | 1,015 |
| 2c | 18a | 4.10 | | 0.67 | | 0.16 | 4.10 | 4.10 | | 1.37 | | 0.16 | 4.10 | | 5.05 | | 1,164 |
| 3c | 18a | 3.93 | | 1.31 | | 0.15 | 3.93 | 3.93 | | 2.71 | | 0.15 | 3.93 | | 10.4 | | 1,472 |
| 4c | 18a | 3.75 | | 2.6 | | 0.15 | 3.75 | 3.75 | | 4.0 | | 0.15 | 3.75 | | 16.0 | | 1,812 |
| 5c | 25a | 4.4 | | 0 | | 0.15 | 4.4 | 4.4 | | 0.8 | | 0.15 | 4.4 | | 3.4 | | 1,294 |
| 6c | 25a | 4.4 | | 0.8 | | 0.15 | 4.4 | 4.4 | | 1.6 | | 0.15 | 4.4 | | 6.8 | | 1,492 |
| 7c | 25a | 4.4 | | 1.6 | | 0.15 | 4.4 | 4.4 | | 2.4 | | 0.15 | 4.4 | | 10.2 | | 1,690 |
| 8c | 25a | 4.4 | | 2.4 | | 0.15 | 4.4 | 4.4 | | 2.8 | | 0.15 | 4.4 | | 11.9 | | 1,786 |
| 9c | 7a | 5.0 | | 0 | | 0.1 | 5.0 | 5.0 | | 1.05 | | 0.1 | 5.0 | | 4.2 | | 1,404 |
| 10c | 7a | 5.0 | | 1.05 | | 0.1 | 5.0 | 5.0 | | 2.1 | | 0.1 | 5.0 | | 8.4 | | 1,648 |
| 11c | 7a | 5.0 | | 2.1 | | 0.1 | 5.0 | 5.0 | | 3.15 | | 0.1 | 5.0 | | 12.6 | | 1,892 |
| 12c | 7a | 5.0 | | 3.15 | | 0.1 | 5.0 | 5.0 | | 4.2 | | 0.1 | 5.0 | | 16.8 | | 2,136 |
| 13c | 6a | 5.0 | | 0 | | 0.1 | 5.0 | 5.0 | | 0.9 | | 0.1 | 5.0 | | 2.75 | | 1,048 |
| 14c | 6a | 4.78 | | 0.86 | | 0.096 | 4.78 | 4.78 | | 1.76 | | 0.096 | 4.78 | | 5.65 | | 1,214 |
| 15c | 6a | 4.55 | | 1.68 | | 0.092 | 4.55 | 4.55 | | 2.58 | | 0.092 | 4.55 | | 8.7 | | 1,390 |
| 16c | 6a | 4.36 | | 2.48 | | 0.088 | 4.35 | 4.35 | | 3.38 | | 0.088 | 4.35 | | 11.8 | | 1,576 |

TABLE V

| Ex. No. | Composition before ||||||| Composition at end ||||||| Molal ratio ||| Theo. mol. wt. |
| | OSC, ex. No. | OSC, lbs. | Oxides ||| Catalyst, lbs. | Solvent, lbs. | OSC, lbs. | Oxides ||| Catalyst, lbs. | Solvent, lbs. | EtO to oxyalkyl. suscept. compd. | PrO to oxyalkyl. suscept. compd. | BuO to oxyalkyl. suscept. compd. | |
| | | | EtO, lbs. | PrO, lbs. | BuO, lbs. | | | | EtO, lbs. | PrO, lbs. | BuO, lbs. | | | | | | |
|---|---|---|---|---|---|---|---|---|---|---|---|---|---|---|---|---|---|
| 1d | 5a | 5.0 | | | 0 | 0.1 | 5.0 | 5.0 | | | 0.6 | 0.1 | 5.0 | | | 1.68 | 1,136 |
| 2d | 5a | 5.0 | | | 0.6 | 0.1 | 5.0 | 5.0 | | | 1.2 | 0.1 | 5.0 | | | 3.36 | 1,256 |
| 3d | 5a | 5.0 | | | 1.2 | 0.1 | 5.0 | 5.0 | | | 1.8 | 0.1 | 5.0 | | | 5.04 | 1,376 |
| 4d | 5a | 5.0 | | | 1.8 | 0.1 | 5.0 | 5.0 | | | 2.4 | 0.1 | 5.0 | | | 6.72 | 1,496 |
| 5d | 5a | 5.0 | | | 2.4 | 0.1 | 5.0 | 5.0 | | | 2.7 | 0.1 | 5.0 | | | 7.56 | 1,556 |
| 6d | 8a | 5.0 | | | 0 | 0.15 | 5.0 | 5.0 | | | 1.0 | 0.15 | 5.0 | | | 2.8 | 1,220 |
| 7d | 8a | 5.0 | | | 1.0 | 0.15 | 5.0 | 5.0 | | | 2.0 | 0.15 | 5.0 | | | 5.6 | 1,420 |
| 8d | 8a | 5.0 | | | 2.0 | 0.15 | 5.0 | 5.0 | | | 2.4 | 0.15 | 5.0 | | | 6.7 | 1,500 |

TABLE VI

| Ex. No. | Composition before ||||||| Composition at end ||||||| Molal ratio ||| Theo. mol. wt. |
| | OSC, ex. No. | OSC, lbs. | Oxides ||| Catalyst, lbs. | Solvent, lbs. | OSC, lbs. | Oxides ||| Catalyst, lbs. | Solvent, lbs. | EtO to oxyalkyl. suscept. compd. | PrO to oxyalkyl. suscept. compd. | BuO to oxyalkyl. suscept. compd. | |
| | | | EtO, lbs. | PrO, lbs. | BuO, lbs. | | | | EtO, lbs. | PrO, lbs. | BuO, lbs. | | | | | | |
|---|---|---|---|---|---|---|---|---|---|---|---|---|---|---|---|---|---|
| 1e | 11b | 5.2 | 3.6 | 0 | | 0.21 | 5.2 | 5.2 | 3.6 | 0.79 | | 0.21 | 5.2 | 18.6 | 3.1 | | 2,148 |
| 2e | 11b | 5.2 | 3.6 | 0.79 | | 0.21 | 5.2 | 5.2 | 3.6 | 1.58 | | 0.21 | 5.2 | 18.6 | 6.2 | | 2,324 |
| 3e | 11b | 5.2 | 3.6 | 1.58 | | 0.21 | 5.2 | 5.2 | 3.6 | 2.37 | | 0.21 | 5.2 | 18.6 | 9.3 | | 2,500 |
| 4e | 11b | 5.2 | 3.6 | 2.37 | | 0.21 | 5.2 | 5.2 | 3.6 | 2.7 | | 0.21 | 5.2 | 18.6 | 11.4 | | 2,676 |
| 5e | 4c | 3.75 | 0 | 4.0 | | 0.15 | 3.75 | 3.75 | 0.53 | 4.0 | | 0.15 | 3.75 | 2.5 | 16.0 | | 1,923 |
| 6e | 4c | 3.75 | 0.53 | 4.0 | | 0.15 | 3.75 | 3.75 | 1.06 | 4.0 | | 0.15 | 3.75 | 5.0 | 16.0 | | 2,034 |
| 7e | 4c | 3.75 | 1.06 | 4.0 | | 0.15 | 3.75 | 3.75 | 1.59 | 4.0 | | 0.15 | 3.75 | 7.5 | 16.0 | | 2,145 |
| 8e | 4c | 3.75 | 1.59 | 4.0 | | 0.15 | 3.75 | 3.75 | 2.12 | 4.0 | | 0.15 | 3.75 | 10 | 16.0 | | 2,256 |
| 9e | 12c | 5.0 | | 4.2 | 0 | 0.15 | 5.0 | 5.0 | | 4.2 | 1.3 | 0.15 | 5.0 | | 16.8 | 4.2 | 2,437 |
| 10e | 12c | 5.0 | | 4.2 | 1.3 | 0.15 | 5.0 | 5.0 | | 4.2 | 2.6 | 0.15 | 5.0 | | 16.8 | 8.4 | 2,738 |
| 11e | 12c | 5.0 | | 4.2 | 2.6 | 0.15 | 5.0 | 5.0 | | 4.2 | 3.9 | 0.15 | 5.0 | | 16.8 | 12.6 | 3,039 |
| 12e | 8d | 5.0 | 0 | | 2.4 | 0.25 | 5.0 | 5.0 | 0.61 | | 2.4 | 0.25 | 5.0 | 2.8 | | 6.7 | 1,622 |
| 13e | 8d | 5.0 | 0.61 | | 2.4 | 0.25 | 5.0 | 5.0 | 1.22 | | 2.4 | 0.25 | 5.0 | 5.6 | | 6.7 | 1,744 |
| 14e | 8d | 5.0 | 1.22 | | 2.4 | 0.25 | 5.0 | 5.0 | 1.83 | | 2.4 | 0.25 | 5.0 | 8.4 | | 6.7 | 1,866 |
| 15e | 8d | 5.0 | 1.83 | | 2.4 | 0.25 | 5.0 | 5.0 | 2.44 | | 2.4 | 0.25 | 5.0 | 11.2 | | 6.7 | 1,988 |
| 16e | 16c | 4.36 | 0 | | 3.38 | 0.088 | 4.36 | 4.36 | 0.68 | 3.38 | | 0.088 | 4.36 | 2.75 | 11.8 | | 1,702 |
| 17e | 16c | 4.36 | 0.68 | | 3.38 | 0.088 | 4.36 | 4.36 | 1.36 | 3.38 | | 0.088 | 4.36 | 5.5 | 11.8 | | 1,828 |
| 18e | 16c | 4.36 | 1.36 | | 3.38 | 0.088 | 4.36 | 4.36 | 2.04 | 3.38 | | 0.088 | 4.36 | 8.25 | 11.8 | | 1,954 |
| 19e | 16c | 4.36 | 2.04 | | 3.38 | 0.008 | 4.36 | 4.36 | 2.72 | 3.38 | | 0.088 | 4.36 | 11.0 | 11.8 | | 2,180 |

TABLE VII

| Ex. No. | OSC, ex. No. | OSC, lbs. | Oxides | | | Catalyst, lbs. | Solvent, lbs. | OSC, lbs. | Oxides | | | Catalyst, lbs. | Solvent, lbs. | Molal ratio | | | Theo. mol. wt. |
|---|---|---|---|---|---|---|---|---|---|---|---|---|---|---|---|---|---|
| | | | EtO, lbs. | PrO, lbs. | BuO, lbs. | | | | EtO, lbs. | PrO, lbs. | BuO, lbs. | | | EtO to oxyalkyl. suscept. compd. | PrO to oxyalkyl. suscept. compd. | BuO to oxyalkyl. suscept. compd. | |
| 1f | 19e | 4.36 | 2.72 | 3.38 | 0 | 0.16 | 4.36 | 4.36 | 2.72 | 3.38 | 1.12 | 0.16 | 4.36 | 11.0 | 11.8 | 2.75 | 2,386 |
| 2f | 19e | 4.36 | 2.72 | 3.38 | 1.12 | 0.16 | 4.36 | 4.36 | 2.72 | 3.38 | 2.24 | 0.16 | 4.36 | 11.0 | 11.8 | 5.5 | 2,592 |
| 3f | 4e | 5.2 | 3.6 | 2.7 | 0 | 0.21 | 5.2 | 5.2 | 3.6 | 2.7 | 0.98 | 0.21 | 5.2 | 18.6 | 11.4 | 3.1 | 2,894 |
| 4f | 4e | 5.2 | 3.6 | 2.7 | 0.98 | 0.21 | 5.2 | 5.2 | 3.6 | 2.7 | 1.96 | 0.21 | 5.2 | 18.6 | 11.4 | 6.2 | 3,112 |
| 5f | 4e | 5.2 | 3.6 | 2.7 | 1.96 | 1.21 | 5.2 | 5.2 | 3.6 | 2.7 | 2.94 | 0.21 | 5.2 | 18.6 | 11.4 | 9.3 | 3,330 |

TABLE VIII

| Ex. No. | Max. temp., °C. | Max. pres., p.s.i. | Time, hrs. | Solubility | | |
|---|---|---|---|---|---|---|
| | | | | Water | Xylene | Kerosene |
| 1b | 125 | 35 | 1.0 | Insoluble | Soluble | Insoluble. |
| 2b | 125 | 35 | 0.9 | ----do---- | ----do---- | Do. |
| 3b | 125 | 35 | 1.2 | ----do---- | ----do---- | Do. |
| 4b | 125 | 35 | 1.2 | Dispersible | ----do---- | Do. |
| 5b | 125 | 35 | 2.0 | ----do---- | ----do---- | Do. |
| 6b | 125 | 35 | 1.2 | Insoluble | ----do---- | Do. |
| 7b | 125 | 35 | 1.4 | ----do---- | ----do---- | Do. |
| 8b | 125 | 35 | 1.4 | ----do---- | ----do---- | Do. |
| 9b | 125 | 35 | 2.0 | ----do---- | ----do---- | Do. |
| 10b | 125 | 35 | 2.5 | ----do---- | ----do---- | Do. |
| 11b | 125 | 35 | 3.5 | Partially dispersible. | Dispersible | Do. |
| 1c | 125 | 35 | 1.1 | Insoluble | Soluble | Do. |
| 2c | 125 | 35 | 1.1 | ----do---- | ----do---- | Do. |
| 3c | 125 | 35 | 1.7 | ----do---- | ----do---- | Dispersible. |
| 4c | 125 | 35 | 1.8 | ----do---- | ----do---- | Soluble. |
| 5c | 125 | 35 | 1.5 | ----do---- | ----do---- | Insoluble. |
| 6c | 125 | 35 | 1.5 | ----do---- | ----do---- | Do. |
| 7c | 125 | 35 | 2.8 | ----do---- | ----do---- | Dispersible. |
| 8c | 125 | 35 | 3.5 | ----do---- | ----do---- | Soluble. |
| 9c | 125 | 35 | 1.6 | ----do---- | ----do---- | Insoluble. |
| 10c | 125 | 35 | 1.6 | ----do---- | ----do---- | Do. |
| 11c | 125 | 35 | 2.1 | ----do---- | ----do---- | Do. |
| 12c | 125 | 35 | 2.2 | ----do---- | ----do---- | Do. |
| 13c | 125 | 35 | 1.3 | ----do---- | ----do---- | Do. |
| 14c | 125 | 35 | 1.5 | ----do---- | ----do---- | Do. |
| 15c | 125 | 35 | 1.7 | ----do---- | ----do---- | Do. |
| 16c | 125 | 35 | 2.0 | ----do---- | ----do---- | Do. |
| 1d | 145 | 35 | 2.3 | ----do---- | ----do---- | Do. |
| 2d | 145 | 35 | 2.4 | ----do---- | ----do---- | Do. |
| 3d | 145 | 35 | 4.0 | ----do---- | ----do---- | Do. |
| 4d | 145 | 35 | 4.2 | ----do---- | ----do---- | Dispersible. |
| 5d | 145 | 35 | 4.5 | ----do---- | ----do---- | Do. |
| 6d | 145 | 35 | 4.0 | ----do---- | ----do---- | Insoluble. |
| 7d | 145 | 35 | 7.0 | ----do---- | ----do---- | Do. |
| 8d | 145 | 35 | 8.2 | ----do---- | ----do---- | Do. |
| 1e | 125 | 35 | 3.5 | Partially dispersible. | Dispersible | Do. |
| 2e | 125 | 35 | 4.0 | Insoluble | Soluble | Do. |
| 3e | 125 | 35 | 4.1 | ----do---- | ----do---- | Dispersible. |
| 4e | 125 | 35 | 4.5 | ----do---- | ----do---- | Soluble. |
| 5e | 125 | 35 | 1.5 | ----do---- | ----do---- | Insoluble. |
| 6e | 125 | 35 | 1.6 | ----do---- | ----do---- | Do. |
| 7e | 125 | 35 | 1.8 | ----do---- | ----do---- | Do. |
| 8e | 125 | 35 | 2.0 | Dispersible | ----do---- | Do. |
| 9e | 145 | 35 | 4.7 | Insoluble | ----do---- | Do. |
| 10e | 145 | 35 | 4.8 | ----do---- | ----do---- | Dispersible. |
| 11e | 145 | 35 | 5.5 | ----do---- | ----do---- | Soluble. |
| 12e | 125 | 35 | 3.0 | ----do---- | ----do---- | Insoluble. |
| 13e | 125 | 35 | 3.1 | ----do---- | ----do---- | Do. |
| 14e | 125 | 35 | 4.2 | ----do---- | ----do---- | Do. |
| 15e | 125 | 35 | 4.3 | Dispersible | ----do---- | Do. |
| 16e | 125 | 35 | 1.6 | Insoluble | ----do---- | Do. |
| 17e | 125 | 35 | 1.7 | ----do---- | ----do---- | Do. |
| 18e | 125 | 35 | 2.0 | ----do---- | ----do---- | Do. |
| 19e | 125 | 35 | 2.2 | Dispersible | ----do---- | Do. |
| 1f | 145 | 35 | 4.3 | Insoluble | ----do---- | Do. |
| 2f | 145 | 35 | 5.8 | ----do---- | ----do---- | Do. |
| 3f | 145 | 35 | 5.0 | ----do---- | ----do---- | Soluble. |
| 4f | 145 | 35 | 5.0 | ----do---- | ----do---- | Do. |
| 5f | 145 | 35 | 6.3 | ----do---- | ----do---- | Do. |

PART 4

As to the use of conventional demulsifying agents reference is made to U. S. Patent No. 2,626,929, dated January 7, 1953, to De Groote, and particularly to Part Three. Everything that appears therein applies with equal force and effect to the instant process, noting only that where reference is made to Example 13b in said text beginning in column 15 and ending in column 18, reference should be to Example 16c, herein described.

Having thus described our invention, what we claim as new and desire to secure by Letters Patent, is:

1. A process for breaking petroleum emulsions of the water-in-oil type characterized by subjecting the emulsion to the action of a demulsifier including hydrophile synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide and methylglycide, and (B) a member selected from the class consisting of oxyalkylation-susceptible fusible, organic solvent-soluble, water-insoluble phenol-formaldehyde-ketone resins, phenol-formaldehyde-higher aldehyde resins, and hybrid phenol-formaldehyde-ketone-higher aldehyde resins; said resins being obtained by the action of a difunctional phenol and the methylol addition product formed by the reaction of formaldehyde and a member selected from the class consisting of aldehydes and ketones having 2 and not over 8 carbon atoms and containing a plurality of reactive alpha-hydrogen atoms; said resins being further characterized by the fact that the divalent bridge radical between phenoic nuclei contains a member selected from the class of carbonyl radicals and hydroxyl radicals, and being additionally characterized by the fact that said divalent bridge radical has at least a 3-carbon atom chain; said resins being formed in the substantial absence of trifunctional phenols; said phenol being of the formula

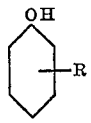

in which R is a hydrocarbon radical having not more than 24 carbon atoms and substituted in the 2,4,6 position; said oxyalkylated resin being characterized by the introduction into the resin molecule of a plurality of divalent radicals having the formula $(R_1O)_n$ in which $R_1$ is a member selected from the class consisting of ethylene radicals, propylene radicals, butylene radicals, hydroxypropylene radicals, and hydroxybutylene radicals, and $n$ is a numeral varying from 1 to 40; with the proviso that at least one mole of alkylene oxide be introduced for each phenolic nucleus.

2. The process of claim 1 with the proviso that the hydrocarbon radical R has at least 4 carbon atoms and not over 14 carbon atoms.

3. The process of claim 1 with the proviso that the hydrocarbon radical R has at least 4 carbon atoms and not over 14 carbon atoms, and that the ketone employed has not over 5 carbon atoms.

4. A process for breaking petroleum emulsions of the water-in-oil type characterized by subjecting the emulsion to the action of a demulsifier including hydrophile synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide and methylglycide, and (B) a member selected from the class consisting of oxyalkylation-susceptible fusible, organic solvent-soluble, water-insoluble phenol-formaldehyde-ketone resins; said resins being obtained by the action of a difunctional phenol and the methylol addition product formed by the reaction of formaldehyde and a ketone having not over 5 carbon atoms and containing a plurality of reactive alpha-hydrogen atoms; said resins being further characterized by the fact that the divalent bridge radical between phenolic nuclei contains a member selected from the class consisting of carbonyl radicals and hydroxyl radicals, and being additionally characterized by the fact that said divalent bridge radical has at least a 3-carbon atom chain; said resins being formed in the substantial absence of trifunctional phenols; said phenol being of the formula

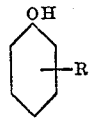

in which R is a hydrocarbon radical having at least 4 and not over 14 carbon atoms and substituted in the 2,4,6 position; said oxyalkylated resin being characterized by the introduction into the resin molecule of a plurality of divalent radicals having the formula $(R_1O)_n$ in which $R_1$ is a member selected from the class consisting of ethylene radicals, propylene radicals, butylene radicals, hydroxypropylene radicals, and hydroxybutylene radicals, and $n$ is a numeral varying from 1 to 40; with the proviso that at least one mole of alkylene oxide be introduced for each phenolic nucleus.

5. The process of claim 4 wherein the ketone is acetone.

6. The process of claim 4 wherein the ketone is acetone and the alkylene oxide is free from a hydroxyl radical.

7. The process of claim 4 wherein the ketone is acetone, the alkylene oxide is free from a hydroxyl radical, and the radical R contains at least 4 carbon atoms and not over 10 carbon atoms.

8. The process of claim 4 wherein the ketone is acetone, the alkylene oxide is free from a hydroxyl radical, and the radical R contains at least 4 carbon atoms and not over 10 carbon atoms substituted in the para position.

9. The process of claim 4 wherein the ketone is acetone, the alkylene oxide is free from a hydroxyl radical, and the radical R contains at least 4 carbon atoms and not over 10 carbon atoms substituted in the para position, the initial molal ratio of formaldehyde to acetone in the manufacture of the resin being within the range of 2-to-1 to 4-to-1.

10. The process of claim 4 wherein the ketone is acetone, the alkylene oxide is free from a hydroxyl radical, and the radical R contains at least 4 carbon atoms and not over 10 carbon atoms substituted in the para position, the initial molal ratio of formaldehyde to acetone in the manufacture of the resin being approximately 3-to-1.

11. The process of claim 1, with the proviso that the hydrophile properties of said oxylalkylated resin in an equal weight of xylene are sufficient to produce an emulsion when said xylene solution is shaken vigorously with one to three volumes of water.

12. The process of claim 2, with the proviso that the hydrophile properties of said oxyalkylated resin in an equal weight of xylene are sufficient to produce an emulsion when said xylene solution is shaken vigorously with one to three volumes of water.

13. The process of claim 3, with the proviso that the hydrophile properties of said oxyalkylated resin in an equal weight of xylene are sufficient to produce an emulsion when said xylene solution is shaken vigorously with one to three volumes of water.

14. The process of claim 4, with the proviso that the hydrophile properties of said oxyalkylated resin in an equal weight of xylene are sufficient to produce an emulsion when said xylene solution is shaken vigorously with one to three volumes of water.

15. The process of claim 5, with the proviso that the hydrophile properties of said oxyalkylated resin in an equal weight of xylene are sufficient to produce an emulsion when said xylene solution is shaken vigorously with one to three volumes of water.

16. The process of claim 6, with the proviso that the hydrophile properties of said oxyalkylated resin in an equal weight of xylene are sufficient to produce an emulsion when said xylene solution is shaken vigorously with one to three volumes of water.

17. The process of claim 7, with the proviso that the hydrophile properties of said oxyalkylated resin in an equal weight of xylene are sufficient to produce an emulsion when said xylene solution is shaken vigorously with one to three volumes of water.

18. The process of claim 8, with the proviso that the hydrophile properties of said oxyalkylated resin in an equal weight of xylene are sufficient to produce an emulsion when said xylene solution is shaken vigorously with one to three volumes of water.

19. The process of claim 9, with the proviso that the hydrophile properties of said oxyalkylated resin in an equal weight of xylene are sufficient to produce an emulsion when said xylene solution is shaken vigorously with one to three volumes of water.

20. The process of claim 10, with the proviso that the hydrophile properties of said oxyalkylated resin in an equal weight of xylene are sufficient to produce an emulsion when said xylene solution is shaken vigorously with one to three volumes of water.

References Cited in the file of this patent

UNITED STATES PATENTS

| | | |
|---|---|---|
| 2,317,726 | Boedeker et al. | Apr. 27, 1943 |
| 2,330,474 | De Groote | Sept. 28, 1943 |
| 2,414,729 | Fleming et al. | Jan. 21, 1947 |
| 2,454,541 | Bock et al. | Nov. 23, 1948 |
| 2,499,365 | De Groote et al. | Mar. 7, 1950 |
| 2,499,366 | De Groote et al. | Mar. 7, 1950 |
| 2,499,368 | De Groote et al. | Mar. 7, 1950 |
| 2,499,370 | De Groote et al. | Mar. 7, 1950 |